United States Patent
Yamagishi

(12) 
(10) Patent No.: US 6,370,143 B1
(45) Date of Patent: Apr. 9, 2002

(54) TRANSMISSION SYSTEM AND TRANSMISSION METHOD, AND RECEPTION SYSTEM AND RECEPTION METHOD

(75) Inventor: Yasuaki Yamagishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/069,674

(22) Filed: Apr. 29, 1998

(30) Foreign Application Priority Data

Apr. 30, 1997 (JP) ............................................. 9-112181

(51) Int. Cl.[7] ............................................. H04L 12/28
(52) U.S. Cl. ........................................ 370/390; 370/486
(58) Field of Search .................................. 370/390, 397, 370/352, 254, 375, 477, 404, 486, 234, 230, 338, 396, 395, 349; 708/300; 709/315, 219, 220, 249, 312, 314, 238, 200; 714/748; 345/333, 327; 725/81, 116, 134, 24, 39, 131, 38, 151; 705/52, 51, 1; 379/115, 117, 127, 90.01; 375/145; 455/3.02, 422, 426, 428; 340/905; 707/104

(56) References Cited

U.S. PATENT DOCUMENTS

| 5,544,161 A | * | 8/1996 | Bigham et al. | ............. 370/397 |
| 5,553,083 A | | 9/1996 | Miller | ........................... 371/32 |
| 5,625,818 A | | 4/1997 | Zarmer et al. | ............... 395/615 |
| 5,708,961 A | * | 1/1998 | Hylton et al. | .................. 725/81 |

(List continued on next page.)

FOREIGN PATENT DOCUMENTS

| EP | 0465804 A2 | 1/1992 | ......... G06F/15/403 |
| JP | 4-230541 | 8/1992 | ........... G06F/12/00 |
| JP | 9-224230 | 8/1997 | ............. H04N/7/16 |
| WO | WO 88/04496 | 6/1988 | ............. H04L/1/12 |
| WO | 97/10558 | 3/1997 | ............ G06F/17/30 |

OTHER PUBLICATIONS

M. Aghadavoodi Et Al., "Improved Selective Repeat ARQ Schemes for Data Communication," IEEE Proceedings of the Vehicular Technology Conference, Stockholm, vol. 3, Jun. 8–10, 1994, pp. 1407–1411.
M. Samaraweera Et Al., "Explicit Loss Indication and Accurate RTO Estimation of TCP Error Recovery Using Satellite Links," IEE Proceedings: Communications, vol. 144, No. 1, Feb. 1997, pp. 47–53.
U.S. application No. 09/067,999, filed Apr. 29, 1998.
U.S. application No. 09/238,971, filed Jan. 27, 1999.
U.S. application No. 08/763,893, filed Dec. 11, 1996.
U.S. application No. 09/296,073, filed Apr. 21, 1999.

*Primary Examiner*—Salvatore Cangialosi
(74) *Attorney, Agent, or Firm*—Sonnenschein, Nath & Rosenthal

(57) ABSTRACT

The object of the present invention is to distribute data efficiently.

A server structures at least update report data, which is data not containing update data and in which information indicating that data has been updated is arranged, in relation to update data, which has been updated, out of data stored in a database, and transmits the update report data over a unidirectional broadcasting network enabling broadcast. When receiving the update report data, a reception terminal transmits a request for the update data, concerning which the fact that data has been updated is reported by the update report data, over a communication network enabling bi-directional communication. The server retrieves the update data corresponding to the request from a database, and transmits it to the reception terminal over the communication network. In this case, when update data is concerned with data enjoying a high audience rating, the server transmits the update data itself to the reception terminal over the broadcasting network.

25 Claims, 12 Drawing Sheets

U.S. PATENT DOCUMENTS

| | | | |
|---|---|---|---|
| 5,734,589 A | * 3/1998 | Kostreski et al. | 345/327 |
| 5,768,539 A | * 6/1998 | Metz et al. | 709/249 |
| 5,801,750 A | 9/1998 | Kurihara | 348/7 |
| 5,815,666 A | 9/1998 | Kurihara | 395/200.61 |
| 5,818,911 A | 10/1998 | Kawashima | 379/90.01 |
| 5,826,166 A | * 10/1998 | Brooks et al. | 725/134 |
| 5,959,997 A | * 9/1999 | Moura et al. | 370/404 |

* cited by examiner

TRANSMISSION SYSTEM AND TRANSMISSION METHOD, AND RECEPTION SYSTEM AND RECEPTION METHOD

BACKGROUND OF THE INVENTION

1. Field of the Invention

The present invention relates to a transmission system and transmission method, a reception system and reception method, and a transmission/reception system. More particularly, this invention is concerned with a transmission system and transmission method, a reception system and reception method, and a transmission/reception system which are preferably employed in distributing data to numerous databases managed according to distributed database techniques, in distributing data according to the Internet protocol (IP) multicast technique, or in distributing data to numerous destinations.

2. Description of the Related Art

Various proposals have been made of a system for distributing data (what is referred to as a system is a logical conglomerate of a plurality of apparatuses but does not count on whether or not the apparatuses of different configurations are integrated into the same housing). For example, "Broadia," "PointCast I-Server," and "Castanet" have been introduced as computer programs for allowing a computer to function as a so-called push type distributed system that utilizes the Internet or an intranet, which has prevailed rapidly these days, and that enables a user to have desired news or any other information distributed to his/her terminal in the same manner as he/she has a newspaper delivered every morning. Incidentally, Castanet allows a user to have not only information but also computer programs distributed. Note that "Castanet" and the like are trademarks given by the manufacturing firms.

By the way, as far as a push type distributed system is concerned, for receiving information, it is necessary to access a server managing and storing the information in advance at a terminal and then request the server to distribute desired information. When accesses from numerous terminals are concentrated on the server, a load on the server increases. Consequently, it takes much time for a user to receive the desired information or the like.

SUMMARY OF THE INVENTION

The present invention attempts to break through the foregoing situation. An object of the present invention is to enable quick and efficient distribution of data.

According to the first aspect of the present invention, there is provided a transmission system comprising: an allocating means for allocating a resource, which is necessary to transmit data over a broadcast network, to update data, which has been updated, out of data stored in a database; a structuring means for structuring transmission data to be transmitted over the broadcast network on the basis of the amount of update data and the resource allocated to the update data; and a transmitting means for transmitting the transmission data over the broadcast network according to the quantity of the resource allocated by the allocating means.

According to the second aspect of the present invention, a transmission method is characterized in that: a resource necessary to transmit data over a broadcast network is allocated to update data, which has been updated, out of data stored in a database; transmission data to be transmitted over the broadcast network is structured on the basis of the amount of update data and the resource allocated to the update data; and the transmission data is transmitted over the broadcast network according to the allocated quantity of the resource.

According to the third aspect of the present invention, there is provided a transmission system comprising: a structuring means for structuring at least data of a second format out of data of a first format in which update data itself is arranged, and the data of the second format, in which update report information indicating that data has been updated is arranged, in relation to update data, which has been updated, out of data stored in a database; an allocating means for allocating at least a portion of a resource necessary to transmit data over a broadcast network to the data of the second format; and a transmitting means for transmitting the data of the second format as transmission data over the broadcast network according to the quantity of the resource allocated by the allocating means.

According to the fourth aspect of the present invention, a transmission method is characterized in that: at least data of a second format out of data of a first format in which update data itself is arranged and the data of the second format, in which update report information indicating that data has been updated is arranged, is structured in relation to update data, which has been updated, out of data stored in a database; at least a portion of a resource necessary to transmit data over a broadcast network is allocated to the data of the second format; and the data of the second format is transmitted as transmission data over the broadcast network according to the allocated quantity of the resource.

According to the fifth aspect of the present invention, there is provided a reception system comprising: a receiving means for receiving at least data of a second format out of data of a first format in which update data itself, which has been updated, out of data stored in a database is arranged, and the data of the second format in which update report information indicating that data has been updated is arranged; a requesting means for issuing a request for update data, concerning which the fact that data has been updated is reported by the update report information arranged in the data of the second format; and a communicating means for communicating with the database over a bi-directional network enabling bi-directional communication. The communicating means transmits a request for update data issued from the requesting means to the database over the bi-directional network, and receives update data transmitted from the database over the bi-directional network in response to the request.

According to the sixth aspect of the present invention, a reception method is characterized in that: at least data of a second format out of data of a first format in which update data itself, which has been updated, out of data stored in a database is arranged, and the data of the second format in which update report information indicating that data has been updated is arranged is received; a request for update data, concerning which the fact that data has been updated is reported by update report information arranged in the data of the second format is transmitted to the database over a bi-directional network enabling bi-directional communication; and update data transmitted from the database over the bi-directional network in response to the request is received.

In the transmission system according to the first aspect of the present invention, the allocating means allocates a resource necessary to transmit data over the broadcast network to update data, which has updated, out of data stored in the database, and the structuring means structures transmission data to be transmitted over the broadcast network on the basis of the amount of update data and the resource allocated to the update data. The transmitting means transmits transmission data over the broadcast network according to the quantity of the resource allocated by the allocating means.

In the transmission method according to the sixth aspect of the present invention, a resource necessary to transmit data over the broadcast network is allocated to update data, which has been updated, out of data stored in the database. Transmission data to be transmitted over the broadcast network is structured on the basis of the amount of update data and the resource allocated to the update data, and the transmission data is transmitted over the broadcast network according to the allocated quantity of the resource.

In the transmission system according to the seventh aspect of the present invention, the structuring means structures at least data of a second format out of data of a first format in which update data itself is arranged and the data of the second format, in which update report information indicating that data has been updated is arranged, in relation to update data, which has been updated, out of data stored in a database. The allocating means allocates at least a portion of a resource necessary to carry out transmission over the broadcast network to the data of the second format. The transmitting means transmits the data of the second format as transmission data over the broadcast network according to the quantity of the resource allocated by the allocating means.

In the transmission method according to the sixth aspect of the present invention, at least data of a second format out of data of a first format in which update data itself is arranged and the data of the second format in which update report information indicating that data has been updated is arranged is structured in relation to update data, which has been updated, out of data stored in the database. At least a portion of the resource necessary to carry out transmission over the broadcast network is allocated to the data of the second format. The data of the second format is transmitted as transmission data over the broadcast network according to the allocated quantity of the resource.

In the reception system according to the thirteenth aspect of the present invention, the receiving means receives at least data of a second format out of data of a first format in which update data itself, which has been updated, out of data stored in the database is arranged and the data of the second format in which update report information indicating that data has been updated is arranged, and the requesting means issues a request for update data, concerning which the fact that data has been updated is reported by the update report information arranged in the data of the second format. The communicating means communicates with the database over the bi-directional network enabling bi-directional communication. In other words, the communicating means transmits the request for update data issued by the requesting means to the database over the bi-directional network, and receives the update data to be transmitted from the database over the bi-directional network in response to the request.

In the reception method according to the fifteenth aspect of the present invention, at least data of a second format out of data of a first format in which update data itself, which has been updated, out of data stored in the database is arranged, and the data of the second format in which update report information indicating that data has been updated is arranged is received. A request for update data, concerning which the fact that data has been updated is reported by the update report information arranged in the data of the second format, is transmitted to the database over the bi-directional network enabling bi-directional communication. The update data transmitted from the database over the bi-directional network in response to the request is received.

DESCRIPTION OF THE PREFERRED EMBODIMENTS

Figure 1:
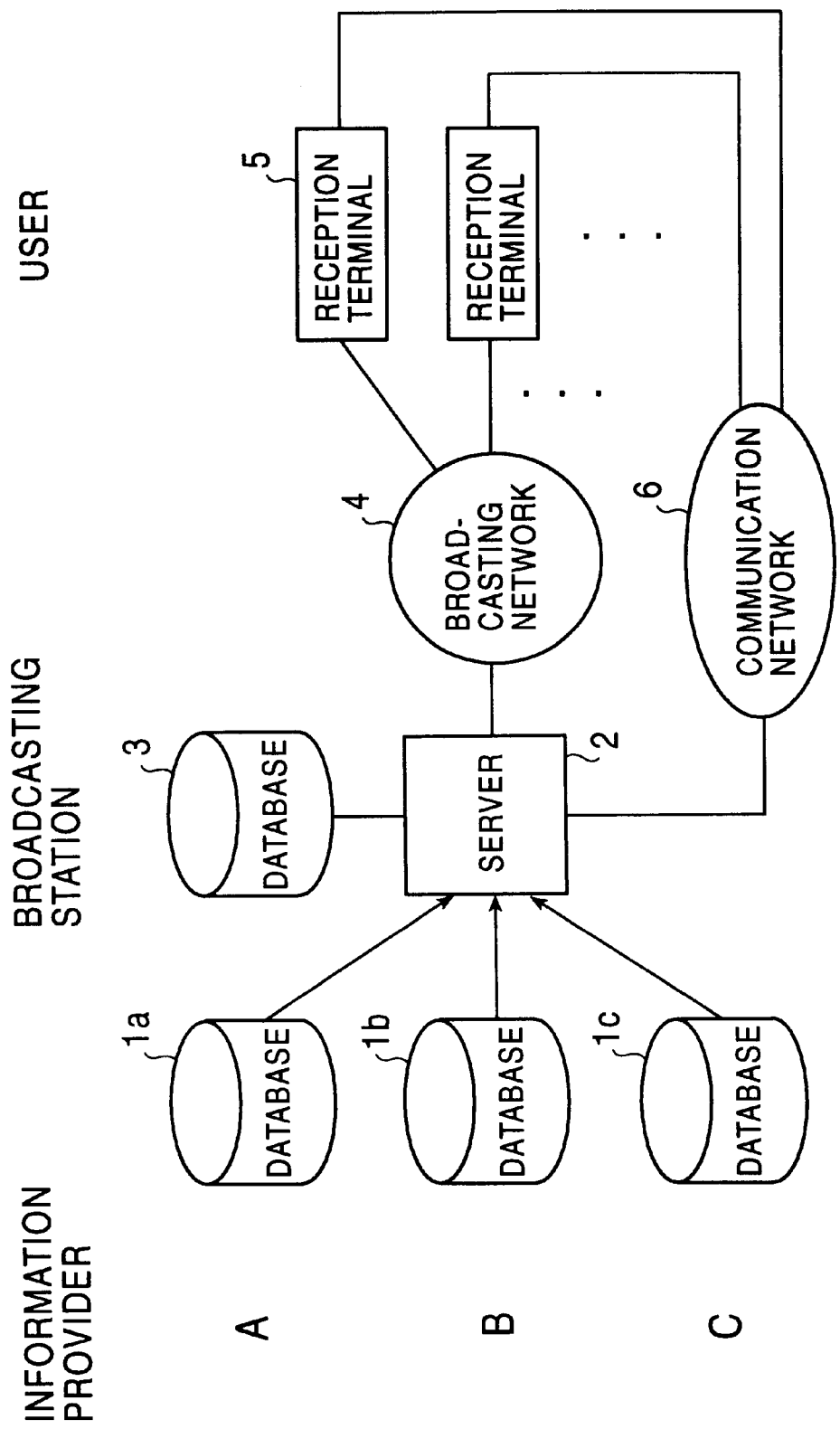
FIG. 1 is a block diagram showing an example of the configuration of an embodiment of a data distribution system to which the present invention applies.

An embodiment of the present invention will be described below. Beforehand, for clarifying the relationship of correspondence between the respective means in accordance with the aspects of the present invention and the components of the embodiment described below, a corresponding component (however, a mere example) will be written down in parentheses succeeding each means. The constituent features of the present invention will be described below.

The transmission system in accordance with the first aspect of the present invention is a transmission system for transmitting data stored in a database over a broadcast network enabling broadcast, and comprises: an allocating means (for example, a resource allocation unit 14 in FIG. 2) for allocating a resource necessary to carry out transmission over the broadcast network to update data, which has been updated, out of data stored in a database; a structuring means (for example, a data structuring unit 17 shown in FIG. 2) for structuring transmission data to be transmitted over the broadcast network on the basis of the amount of update data and the resource allocated to the update data; and a transmitting means (for example, a transmission unit 18 shown in FIG. 2) for transmitting transmission data over the broadcast network according to the quantity of the resource allocated by the allocating means.

The transmission system in accordance with the fourth aspect of the present invention further comprises: a communicating means (for example, a communication control unit 11 shown in FIG. 2) for communicating with a reception system for receiving transmission data transmitted over the broadcast network over a bi-directional network enabling bi-directional communication; and a retrieving means (for example, a data retrieval unit 16 shown in FIG. 2) for retrieving update data from the database when a request for the update data, concerning which the fact that data has been updated is reported by the update report information arranged in the data of the second format, is received. The communicating means transmits update data, which is retrieved by the retrieving means, to the reception system, which has issued the request for the update data, over the bi-directional network.

The communication system in accordance with the fifth aspect of the present invention further comprises: a communicating means (for example, a communication control unit 11 shown in FIG. 2) for communicating with a reception system for receiving transmission data transmitted over the broadcast network over a bi-directional network enabling bi-directional communication; and a collecting means (for example, a history management unit 12 shown in FIG. 2) for collecting history information concerning the audience history of transmission data in the reception system over the bi-directional network. The allocating means allocates a resource to update data on the basis of the history information.

The transmission system in accordance with the seventh aspect of the present invention is a transmission system for transmitting data stored in a database over a broadcast network enabling broadcast, and comprises: a structuring means (for example, a data structuring unit 17 shown in FIG. 2) for structuring at least data of a second format out of data of a first format in which update data itself is arranged, and the data of the second format, in which update report information indicating that data has been updated is arranged, in relation to update data, which has been updated, out of data stored in the database; an allocating means (for example, a resource allocation unit 14 shown in FIG. 2) for allocating at least a portion of a resource necessary to transmit data over the broadcast network to the data of the second format; a transmitting means (for example, a transmission unit 18 shown in FIG. 2) for transmitting the data of the second format as transmission data over the broadcast network according to the quantity of the resource allocated by the allocating means.

The transmission system in accordance with the tenth aspect of the present invention further comprises a communicating means (for example, a communication control unit 11 shown in FIG. 2) for communicating with a reception system for receiving transmission data transmitted over the broadcast network over a bi-directional network enabling bi-directional communication; and a collecting means (for example, a history management unit 12 shown in FIG. 2) for collecting history information concerning the audience history of transmission data in the reception system over the bi-directional network. The allocating means allocates a resource to the data of the first format.

The transmission system in accordance with the eleventh aspect of the present invention further comprises: a communicating means (for example, a communication control unit 11 shown in FIG. 2) for communicating with a reception system for receiving transmission data transmitted over the broadcast network over a bi-directional network enabling bi-directional communication; and a retrieving means (for example, a data retrieval unit 16 shown in FIG. 2) for retrieving update data from the database when the communicating means has received a request for update data, concerning which the fact that data has been updated is reported by the update report information arranged in the data of the second format, issued by the reception system. The communicating means transmits the update data, which has been retrieved by the retrieving means, to the reception system, which has issued the request, over the bi-directional network.

The reception system in accordance with the thirteenth aspect of the present invention is a reception system for receiving data stored in a database and transmitted over a broadcast network enabling broadcast, and comprises: a receiving means (for example, a reception unit 21 shown in FIG. 10) for receiving at least data of a second format out of data of a first format in which update data itself, which has been updated, out of data stored in the database is arranged, and the data of the second format in which update report information indicating that data has been updated is arranged; a requesting means (for example, a request unit 29 shown in FIG. 10) for issuing a request for update data, concerning which the fact that data has been updated is reported by the update report information arranged in the data of the second format; and a communicating means (for example, a communication control unit 28 shown in FIG. 10) for communicating with the database over a bi-directional network enabling bi-directional communication. The communicating means transmits the request for update data issued from the requesting means to the database over the bi-directional network, and receives the update data transmitted from the database over the bi-directional network in response to the request.

The reception system in accordance with the fourteenth aspect of the present invention further comprises a managing means (for example, a history management unit 26 shown in FIG. 10) for managing history information concerning the audience history of update data. The communicating means transmits the history information to the database over the bi-directional network.

Needless to say, the description does not mean that the foregoing means are limited to the foregoing components.

FIG. 1 shows an example of the configuration of an embodiment of a data distribution system to which the present invention applies.

Information providers A to C have databases 1*a* to 1*c* in which various kinds of data are stored. A variety of data items, for example, data varying in real time such as traffic information, weather information, and stock information, data not varying in real time, text data, image data, voice data, and computer programs can be stored in the databases 1*a* to 1*c*.

From among data stored in the databases 1*a* to 1*c*, new data not yet stored in a database 3 included in a server 2, or updated data is distributed to the server 2. In the server 2, the contents of the database 3 are updated with the distributed data (or the distributed data is newly stored in the database 3). When the contents of the database 3 are updated, the server 2 structures transmission data to be transmitted to a reception terminal (or a set-top box) 5 in relation to the updated data (hereinafter, which may be called update data).

The transmission data is transmitted over a unidirectional network (which shall be called a broadcasting network in order to discriminate it from a communication network 6 to be described later) enabling at least broadcast of data to numerous users, for example, a satellite line, a CATV network, or a ground wave.

Transmission data transmitted (distributed) over the broadcasting network 4 as mentioned above is received by a reception terminal 5 owned by a user. The reception terminal 5 selects user-desired data out of the received transmission data, and stores the selected transmission data.

In the server 2, as described later, in relation to update data, either data of a format in which the update data itself is arranged (hereinafter which may be called normal-format data) or data of a format in which update report information indicating that data has been updated is arranged but the update data is not contained (hereinafter which may be called update report-format data) is structured and then transmitted as transmission data.

When the reception terminal 5 receives and selects normal-format data, a user can view update data arranged in the normal-format data. When update report-format data is received and selected, since the update report-format data does not contain update data, the update data cannot be viewed.

When receiving and selecting update report-format data, the reception terminal 5 requests the server 2 to send update data, concerning which the fact that data has been updated is reported by the update report information arranged in the update report-format data, over a network enabling at least bi-directional communication (which shall be called a communication network in order to discriminate it from the aforesaid broadcasting network 4), for example, an analog public network, the Integrated System Digital Network (ISDN), or the Internet. In response to the request, the server 2 retrieves the requested update data from the database 3 and transmits it to the reception terminal 5 over the communication network 6. The reception terminal 5 then receives and stores the update data transmitted from the server 2.

The update data stored in the reception terminal 5 is, for example, displayed or output as voice according to a given operation performed by the user at the reception terminal 5. When the user thus views update data, the reception terminal 5 stores history information concerning the audience history of the update data.

The reception terminal 5 transmits the stored history information to the server 2 over the communication network 6 in response to a request issued from the server 2 or autonomously. The server 2 receives the history information thus sent from the reception terminal 5. Likewise, the server 2 receives history information sent from the other reception terminals and calculates statistics from the history information. Based on the result of calculating statistics, a so-called audience rating or a rate at which the data is viewed by users is calculated. After calculating the audience rating of each data, the server 2 allocates a resource necessary to carry out transmission over the broadcasting network 4 to each data.

For example, to data enjoying a high audience rating, a major portion of a frequency band of transmission permitted by the broadcasting network 4 is allocated. As for a processing time required by the server 2, a long time is allocated to processing of the data. By contrast, a smaller portion of the frequency band of transmission permitted by the broadcasting network 4 is allocated to data suffering from a low audience rating. As for the processing time required by the server 2, a short time is allocated to processing of the data.

Furthermore, the server 2 structures transmission data in consideration of the quantity of a resource allocated to update data and the amount of the update data. In other words, when the allocated quantity of the resource is large for the amount of data, even if the update data itself is transmitted, high-speed data distribution can be achieved. Normal-format data is therefore structured as transmission data and then transmitted. By contrast, when the allocated quantity of the resource is small for the amount of data, if the update data itself is transmitted, high-speed data distribution becomes hard to do. Update report-format data whose amount is small and which does not contain the update data itself is therefore structured as transmission data and then transmitted.

In the server 2, at least a portion of a resource is allocated all the time or intermittently in order to transmit update report-format data. Irrespective of an audience rating, update report-format data is structured in relation to every update data and transmitted using the allocated resource.

According to the foregoing data distribution system, a larger resource is allocated to data enjoying a high audience rating. Such data is distributed as a top priority. Consequently, efficient data distribution can be achieved.

Furthermore, since data is broadcast over the broadcasting network 4, users need not access the server 2 but can obtain the data. Moreover, it can be avoided that accesses gained by the users are concentrated on the server 2 to eventually increase the load on the server 2.

Moreover, as far as data suffering from a low audience rating is concerned, the amount of data is taken into account, and update report-format data not containing the data itself is structured and distributed. By the way, only when the update report-format data is received and selected, the reception terminal 5 accesses the server 2 over the communication network 6 and makes a request for corresponding update data. In response to the request, the server 2 transmits the update data to the reception terminal 5 over the communication network 6.

Structuring and transmitting normal-format data in relation to data suffering from a low audience rating is not efficient because a major portion of a resource required for transmission to be performed over the broadcasting network 4 will be used to transmit data not viewed by almost all users, and, as a result, transmission of data enjoying a high audience rating will be delayed. By contrast, when update report-format data is structured in relation to data suffering from a low audience rating and transmitted over the broadcasting network 4, if the data suffering from the low audience rating is transmitted over the communication network 6 in response to a request issued from the reception terminal 5, efficient data distribution can be achieved. That is to say, a major portion of a resource required for transmission to be performed over the broadcasting network 4 need not be used to transmit data suffering from a low audience rating. As a result, data enjoying a high audience rating can be broadcast to all users for a short period of time over the broadcasting network 4.

Moreover, when update report-format data is structured in relation to every update data and distributed all the time or intermittently, the reception terminal 5 can be prevented from, say, missing data. In other words, when the unidirectional broadcasting network 4 is used to transmit normal-format data alone, compared with when the so-called handshaking is adopted to transfer data, a probability that normal reception ends in failure is high. When update report-format data is transmitted all the time or intermittently, even if the reception terminal 5 fails to receive normal-format data, the reception terminal 5 can receive update report-format data and thus recognize the fact that data has been updated. The reception terminal 5 can eventually receive desired data over the communication network 6.

As mentioned above, efficient data distribution can be achieved by utilizing both the unidirectional broadcasting network 4 enabling broadcast and the communication network 6 enabling bi-directional communication. Moreover, the reception terminal 5 can be prevented from missing data. The broadcasting network 4 is utilized, typically, while the communication network 6 is utilized in a complementary manner. Consequently, compared with the communication network 6 alone that is a network requiring high communication cost and enabling bi-directional communication is utilized, communication cost can be reduced.

Incidentally, the broadcasting network 4 and communication network 6 need not be physically separated networks. That is to say, when the broadcasting network 4 is realized with, for example, a CATV network, the CATV network may also be used as the communication network 6. Moreover, when data distribution over the broadcasting network 4 is carried out according to, for example, the IP multicast technique utilizing the Internet or the like, the communication network 6 may be realized with the Internet.

Moreover, data transmission from the server 2 to the reception terminal 5 may be, for example, scrambled so that specified users alone (only users entered into a contract for reception) can receive data.

Figure 2:
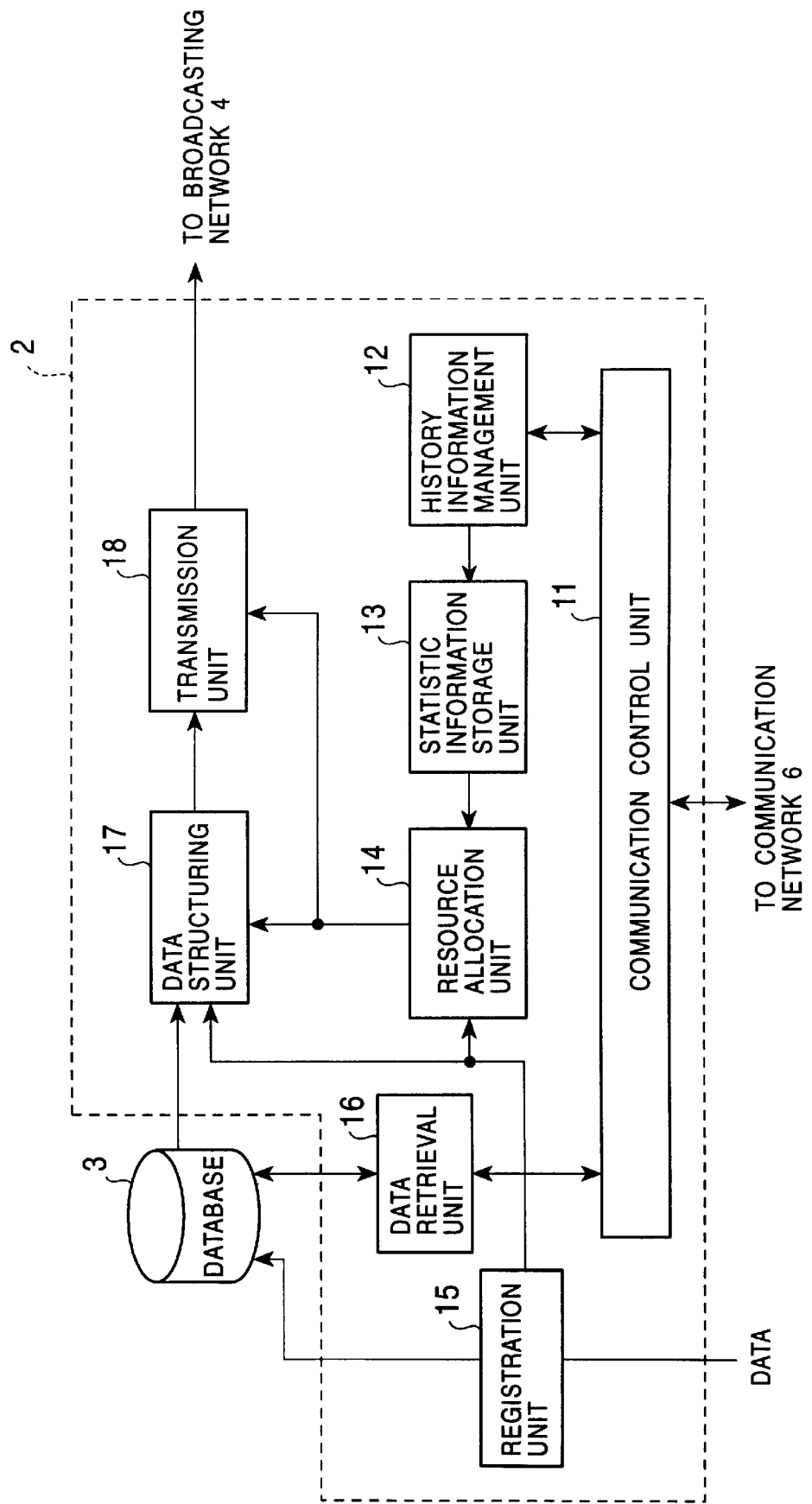
FIG. 2 is a block diagram showing an example of the configuration of a server 2 shown in FIG. 1.

FIG. 2 shows an example of the configuration of the server 2 shown in FIG. 1.

A communication control unit 11 is realized with, for example, a modem or terminal adapter (TA), and designed to control communication to be performed over the communication network 6. A history management unit 12 receives history information, which is transmitted from the reception terminal 5 over the communication network 6, from the communication control unit 11, processes the information to calculate a statistic, and thus provides statistic information representing an audience rating of each data. A statistic information storage unit 13 stores statistic information (audience ratings) provided by the history information management unit 12 in one-to-one correspondence with data items. A resource allocation unit 14 allocates a resource necessary to carry out transmission over the broadcasting network 4 to each data (update data) on the basis of the statistic information stored in the statistic information storage unit 13.

A registration unit 15 registers data distributed from the databases 1a to 1c of the information providers A to C in the database 3. Furthermore, when data in the database 3 has been updated, the registration unit 15 informs the resource allocation unit 14 and a data structuring unit 17 of the fact. A data retrieval unit 16 receives a request for data transmitted from the reception terminal 5 over the communication network 6 through the communication control unit 11, and retrieves the data. The data structuring unit 17 structures transmission data, which is to be transmitted over the broadcasting network 4 by a transmission unit 18, in relation to data (update data) concerning which the fact that data has been updated is informed by the registration unit 15. In other words, the data structuring unit 17 structures the aforesaid normal-format data or update report-format data as transmission data on the basis of the amount of update data and the quantity of a resource allocated to the update data by the resource allocation unit 14, and outputs the transmission data to the transmission unit 18. The transmission unit 18 transmits the transmission data sent from the data structuring unit 17 over the broadcasting network 4 according to the quantity of the resource allocated to the transmission data by the resource allocation unit 14.

The server 2 having the foregoing components carries out three kinds of processing, that is, registration of registering data in the database 3, data transmission of transmitting data over the broadcasting network 4, and request data transmission of transmitting data, for which a request has been issued from the reception terminal 5 over the communication network 6, over the communication network 6.

Figure 3:
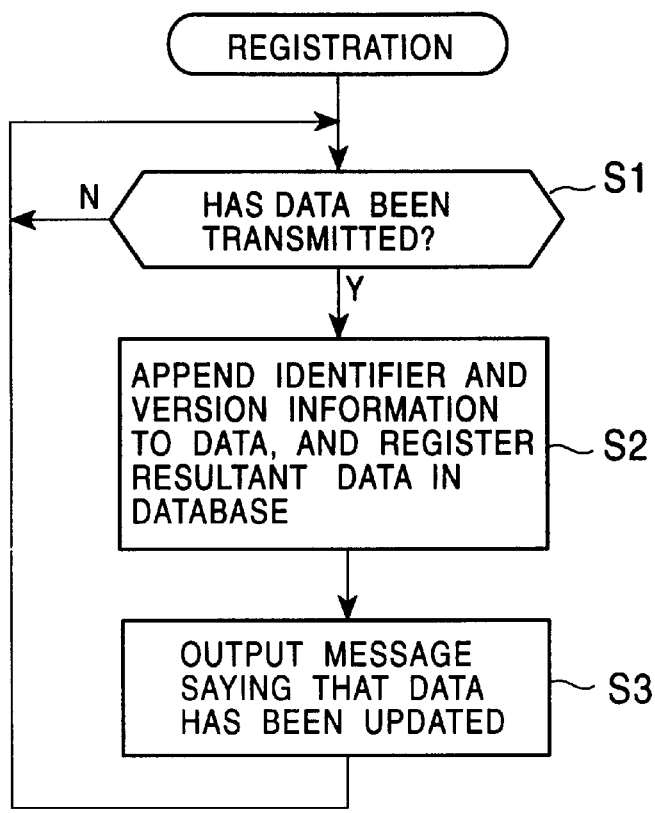
FIG. 3 is a flowchart describing registration to be performed by the server 2.
Figure 4:
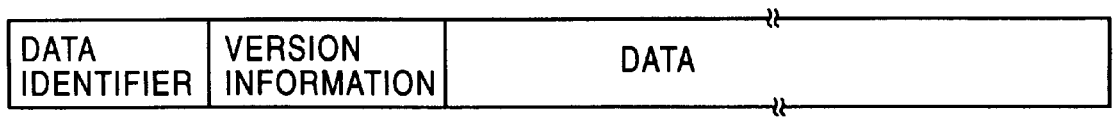
FIG. 4 is a diagram showing the format of data registered in a database 2 shown in FIG. 2.

To be more specific, in registration, as described in the flowchart of FIG. 3, first, at step S1, whether or not data has been distributed from any of the databases 1a to 1c of the information providers A to C is judged by the registration unit 15. If it is judged by the registration unit 15 that data has not been distributed, control is returned to step S1. If it is judged at step S1 that data has been distributed, control is passed to step S2. The registration unit 15 appends, for example, as shown in FIG. 4, a data identifier and version information to the data, and registers resultant data in the database 3.

Incidentally, the data identifier is used to identify the data. For example, a unique data identifier is assigned for each classified information of traffic information, weather information, or stock information. Moreover, version information indicates how new the data is. For example, an integer to be incremented by one every time data is updated is employed. As for data items to which the same data identifier is appended, the newest data can be identified by comparing version information appended to the data with the others. Thus, whether or not data has been updated can be recognized. The version information therefore fills the role of update report information.

Incidentally, the data identifier and version information have, herein, for example, a fixed length.

When data to which a data identifier and version information are appended is registered in the database 3, control is passed to step S3. The registration unit 15 outputs the data identifier of the data (update data) newly registered in the database 3 together with a message saying that new data has been registered to the resource allocation unit 14 and data structuring unit 17. Control is then returned to step S1.

Next, data transmission will be described with reference to the flowchart of FIG. 5.

In this case, the server 2 first collects history information at step Sl. Specifically, for example, the history management unit 12 controls the communication control unit 11 so as to access the reception terminal 5 over the communication network 6, and to then issue a request for history information. In response to the request, at step S62 in FIG. 14 to be referred to later, the reception terminal 5 transmits history information over the communication network 6. The history information is received by the communication control unit 11 and supplied to the history management unit 12. At step Sll, history information is collected from the other reception terminals 5 in the same manner.

Control is then passed to step S12. The history management unit 12 calculates a statistic of history information for each data, and works out an audience rating as statistic information. The statistic information is supplied and stored to and in the statistic information storage unit 13. Control is then passed to step S13. At step S13, the resource allocation unit 14 allocates a resource necessary to carry out transmission over the broadcasting network 4 to data, concerning which the fact that data has been updated is informed by the registration unit 15, on the basis of the statistic information stored in the statistic information storage unit 13.

Specifically, for example, assume that the fact that the data items Da, Db, and Dc have been updated is informed by the registration unit 15, and history information saying that a user Ua has viewed the data items Da, Db, and Dc once, twice, and zero time respectively, and a user Ub has viewed the data items twice, four times, and once respectively is provided. In this case, the history management unit 12 adds up history information for each of the data items Da, Db, and Dc, and thus calculates statistic information items. In this case, the statistic information items of the data items Da, Db, and Dc are calculated as 3 (=0+3), 6 (=2+4), and 1 (=0+1) respectively.

Figure 6:
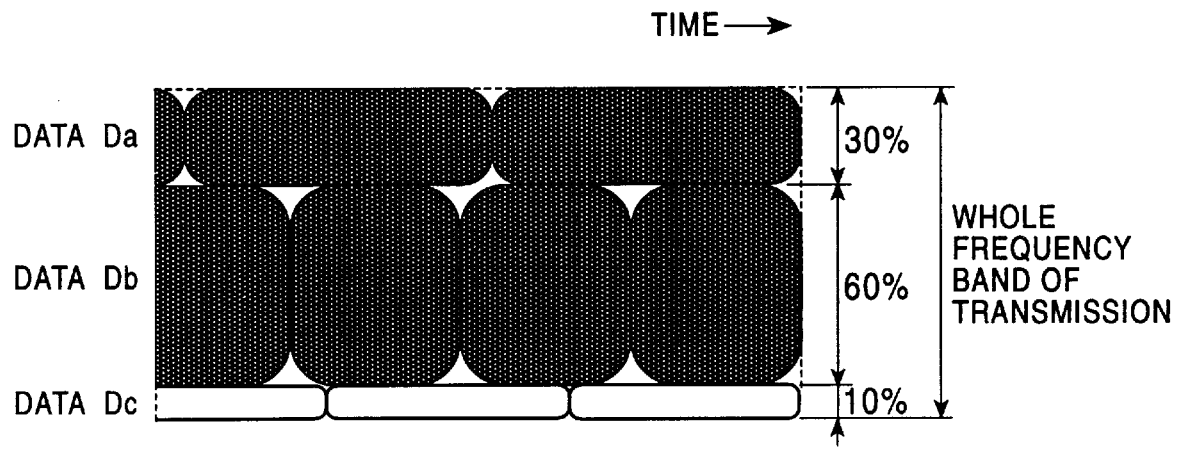
FIG. 6 is a diagram for explaining the processing of step S13 described in FIG. 5 in detail.

Based on the statistic information, the resource allocation unit 14 allocates a resource necessary to carry out transmission over the broadcasting network 4 to each update data. In other words, the resource allocation unit 14 allocates bands within the frequency band of transmission permitted by the broadcasting network 4 to the update data items Da, Db, and Dc in proportion to ratios of the statistic information items of the update data Da, Db, and Dc to the total statistic information. Specifically, in this case, as shown in FIG. 6, 30% of the frequency band of transmission permitted by the broadcasting network 4 (=3/(3+6+1)×100%), 60% thereof (=6/(3+6+1)×100%), and 10% thereof (=1/(3+6+1)×100%) are allocated to the update data items Da, Db, and Dc respectively.

Herein, the foregoing ratios may be calculated and stored as statistic information in the statistic information storage unit 13.

The quantity of a resource allocated to each update data by the resource allocation unit 14 is supplied to the data structuring unit 17 and transmission unit 18. When receiving the quantity of the resource allocated to each update data from the resource allocation unit 14, the data structuring unit 17 identifies the update date on the basis of the data identifier supplied from the registration unit 15, references the database 3, and thus recognizes the amount of data at step S14. Furthermore, the data structuring unit 17 structures normal-format data or update report-format data in relation to each update data on the basis of the amount of the update data and the allocated quantity of the resource.

Figure 7A:
FIGS. 7A and 7B are diagrams showing the formats of transmission data structured by a data structuring unit 17 shown in FIG. 2.
Figure 7B:

Herein, FIGS. 7A and 7B show the formats of normal-format data and update report-format data respectively.

Normal-format data is, for example, as shown in FIG. 7A, structured according to the same format as the format (FIG. 4) according to which the registration unit 15 registers data (update data) in the database 3. A data identifier and version information are appended to data. By contrast, update report-format data is, for example, as shown in FIG. 7B, structured according to a format in which update data itself is removed from the normal-format data, and is therefore composed of a data identifier and version information alone.

As mentioned above, herein, the data identifier and version information have a fixed length. Update report-format data therefore also has a fixed length. By contrast, since an amount of update data is generally variable, an amount of normal-format data is also variable.

Normal-format data or update report-format data structured in relation to each update data by the data structuring unit 17 is supplied as transmission data to the transmission unit 18. At step S15, the transmission unit 18 transmits the transmission data sent from the data structuring unit 17 over the broadcasting network 4 according to the quantity of the resource allocated by the resource allocation unit 14. Control is then passed to step S16. At step S16, the transmission unit 18 judges whether or not a given time has elapsed since the timing that transmission data sent from the data structuring unit 17 was transmitted first. If it is judged that the given time has not elapsed, control is returned to step S15. In this case, therefore, transmission of transmission data is repeated. Specifically, since data transmission over the broadcasting network 4 is carried out unidirectionally from the server 2 to the reception terminal 5, whether or not data transmission and reception can be achieved accurately between the server 2 and reception terminal cannot be verified. The server 2 therefore repeats transmission of transmission data for the given time. This is intended to improve a probability that accurate data reception is achieved by the reception terminal 5.

By contrast, if it is judged at step S16 that the given time has elapsed since the timing that transmission data sent from the data structuring unit 17 was transmitted first, control is returned to step S11. Thereafter, the same processing as the aforesaid one is repeated.

As mentioned above, statistic information that is an audience rating of data is calculated periodically. A quantity of a resource to be allocated to each update data is determined on the basis of the statistic information. Transmission data is then structured on the basis of the allocated quantity of the resource and the amount of the update data, and then transmitted.

Incidentally, calculation of statistic information may be carried out non-periodically.

Next, processing carried out by the data structuring unit 17 for structuring normal-format data or update report-format data on the basis of an amount of update data and an allocated quantity of a resource will be described.

For example, assume that an amount of update data is 999 bytes and an amount of data including a data identifier and version information is 1 byte. When normal-format data or update report-format data is structured in relation to the update data, the amount of the normal-format data or update-report-format data is 1000 bytes or 1 byte. Assume that 10% of a resource necessary to carry out transmission over the broadcasting network 4 is allocated to the update data, and that the 10% of the resource is used to transmit the normal-format data of 1000 bytes long or the update report-format data of 1 byte long for, for example, 1000 sec. or 1 sec.

Moreover, assuming that the reception terminal 5 issues a request for normal-format data of 1000 bytes long, an average value of the time required until the server 2 transmits the requested normal-format data over the communication network 6 after the request is issued shall be, for example, 500 sec.

In this case, when the communication network 6 is utilized, the reception terminal 5 can get the normal-format data of 1000 bytes long for a time that is 500 sec. (=1000–500) shorter than the time required when the broadcasting network 4 is utilized.

As mentioned above, if normal-format data can be transmitted over the communication network 6 for a considerably shorter time than the time required for transmitting the data over the broadcasting network 4, the data structuring unit 17 structures update report-format data as transmission data in relation to update data. Otherwise, normal-format data is structured as transmission data.

When an audience rating of data is 0% or an audience rating close to 0% is markedly lower than the audience ratings of the other data items, even if the data is updated, any resource necessary to carry out transmission over the broadcasting network 4 will not be allocated to the update data. For update data to which no resource is allocated, neither normal-format data nor update report-format data (whose amount is much smaller than that of the normal-format data) is transmitted. However, even when an audience rating is 0% or close to 0%, it cannot be said that a user will not view the update data in the future. It is therefore not preferable that the update data is not distributed at all. Nevertheless, it is also not preferable from the viewpoint of efficient data distribution that normal-format data is structured in relation to data suffering from a low audience rating, a major portion of a resource is allocated to the data, and the normal-format data is transmitted over the broadcasting network 4.

The resource allocation unit 14 allocates a portion of a resource necessary to carry out transmission over the broadcasting network 4 (which hereinafter may be called an update-only resource) to update report-format data all the time or intermittently. Moreover, the data structuring unit 17 structures update report-format data in relation to every update data. The thus structured update report-format data items are transmitted over the broadcasting network 4 by utilizing the update-only resource.

Figure 8:
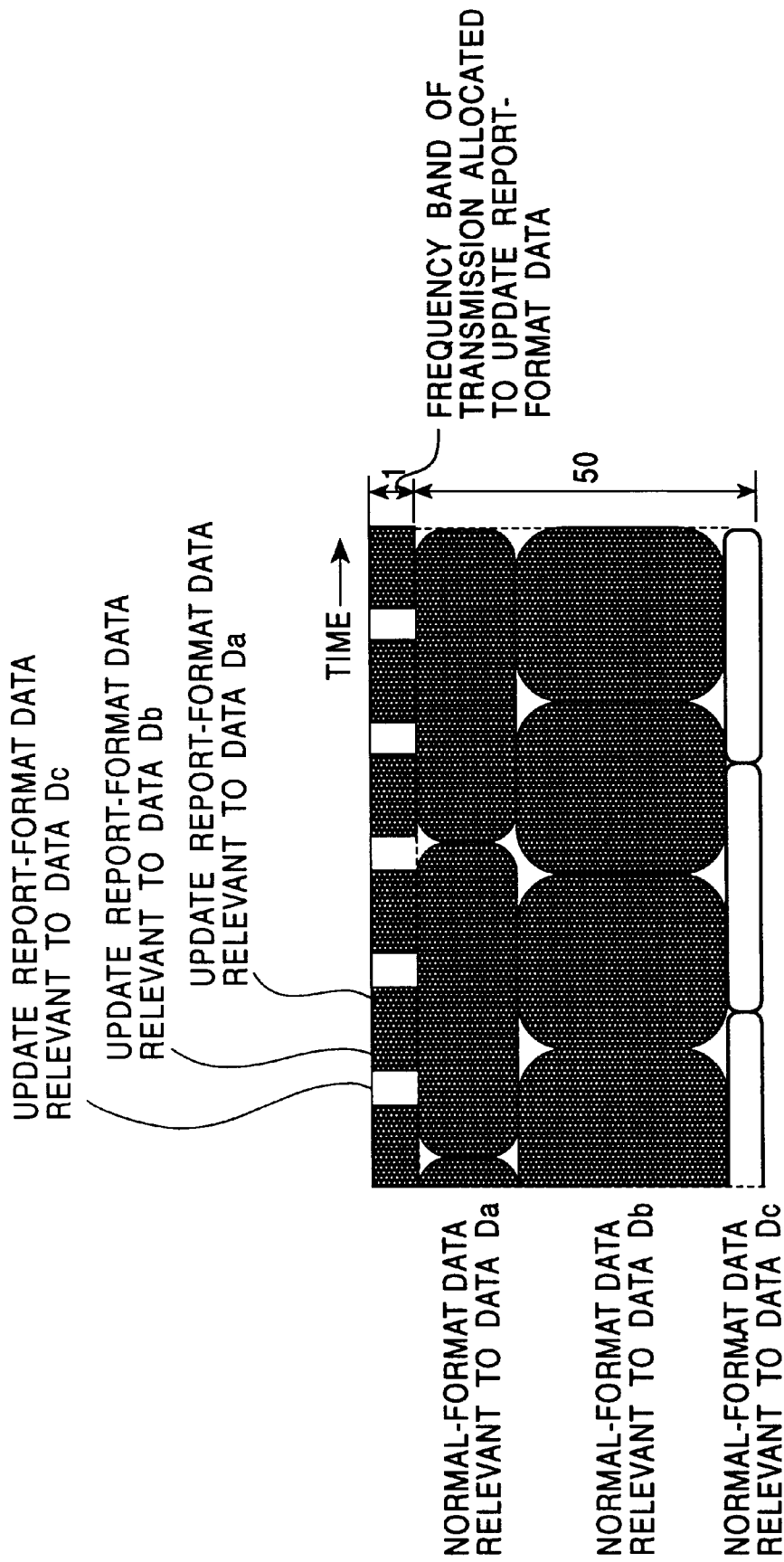
FIG. 8 is a diagram for explaining the processing of step S15 described in FIG. 5 in detail.

Specifically, for example, when update data items Da, Db, and Dc like the ones described in conjunction with FIG. 6 are available, the resource allocation unit 14 divides the frequency band of transmission permitted by the broadcasting network 4 into two bands whose ratio is, for example, as shown in FIG. 8, 1:50. The former band (1/51 of the whole frequency band) is regarded as an update-only resource. The data structuring unit 17 structures update report-format data in relation to each of the update data items Da, Db, and Dc. The transmission unit 18 transmits all the update report-format data items relevant to the update data items Da, Db, and Dc by utilizing the update-only resource.

Out of the resource necessary to carry out transmission over the broadcasting network 4, a resource remaining after the update-only resource is subtracted, (in the foregoing case, 50/51 of the whole frequency band) is allocated to the update data items Da, Db, and Dc in the same manner as that shown in FIG. 6. Data to be transmitted using the remaining resource may be either normal-format data or update report-format data according to an amount of update data and an allocated quantity of the resource. Herein, since update report-format data is transmitted by utilizing the update-only resource, all data items to be transmitted by utilizing the remaining resource are preferably normal-format data items.

When update report-format data is received and selected at the reception terminal 5, a request for corresponding update data is, as mentioned above, issued to the server 2 over the communication network 6. The server 2 transmits the requested update data to the reception terminal 5 over the communication network 6. When at least a portion of a resource is allocated to update report-format data, if update report-format data is structured in relation to every update data and transmitted all the time or intermittently, it can be prevented that some update data is not distributed to users at all. Furthermore, since an amount of update report-format data is smaller than that of normal-format data, when the update report-format data is transmitted over the broadcasting network 4, only a small resource is needed. Consequently, the transmission of update report-format data will not greatly affect transmission of normal-format data in which update data enjoying a high audience rating is arranged.

Update report-format data has, as mentioned above, in this embodiment, a fixed length (however, the update report-format data may have a variable length). Transmission of the update report-format data using the update-only resource is carried out at a so-called uniform density for every update data.

Figure 9:
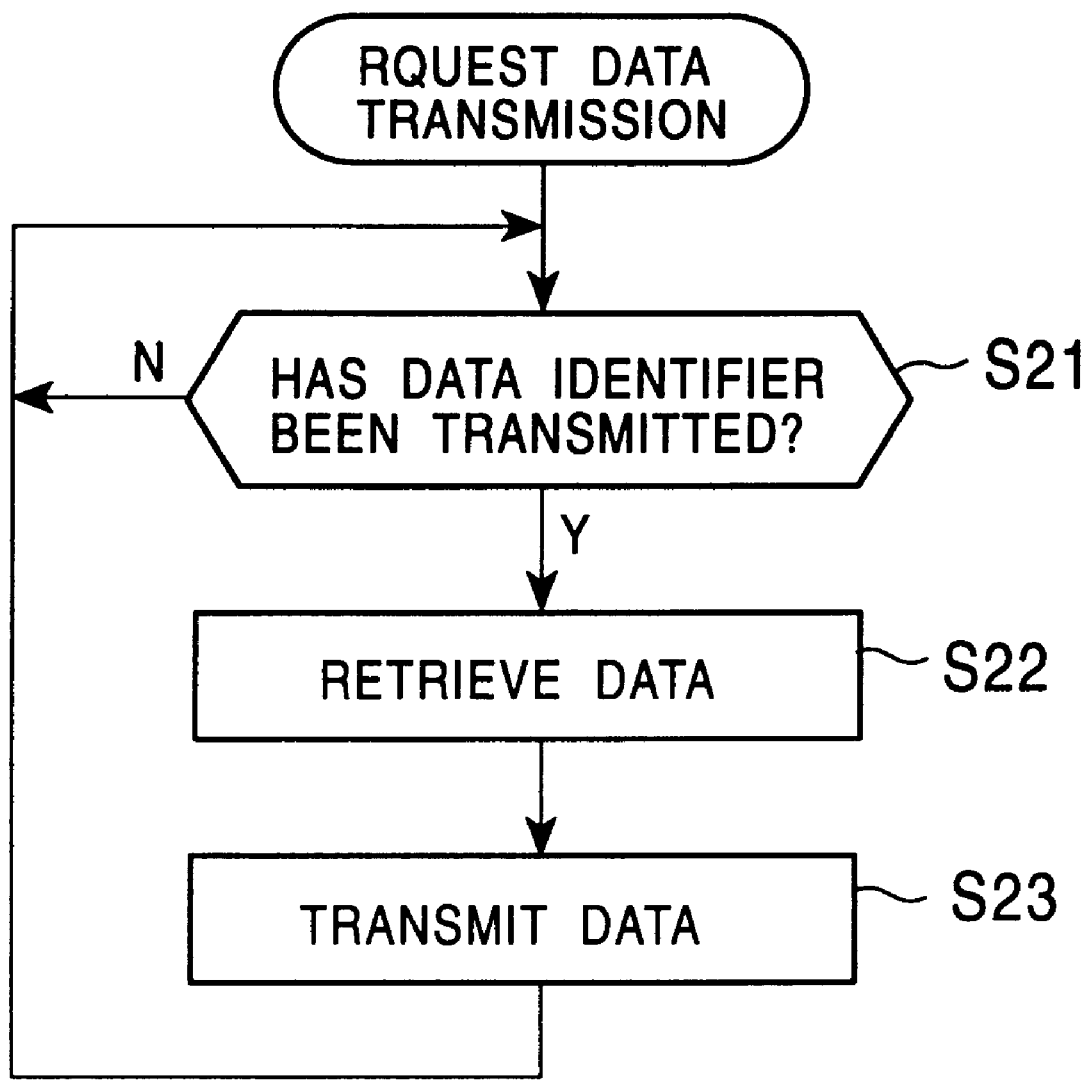
FIG. 9 is a flowchart describing request data transmission to be performed by the server 2.

Next, referring to the flowchart of FIG. 9, request data transmission to be carried out by the server 2 will be described.

In this case, at step S21, it is judged by the communication control unit 11 whether or not a data identifier has been transmitted from the reception terminal 5 over the communication network 6. If it is judged that the data identifier has not been transmitted, control is returned to step S21. If it is judged at step S21 that the data identifier has been transmitted, the communication control unit 11 transfers the data identifier to the data retrieval unit 16. When receiving the data identifier, the data retrieval unit 16 retrieves update data, to which the data identifier is appended, from the database 3 at step S22. The retrieval unit 16 then supplies the update data to the communication control unit 11 according to the stored format, that is, the format of normal-format data. The communication control unit 11 receives normal-format data from the data retrieval unit 16. At step S23, the normal-format data is transmitted to the reception terminal (herein, the reception terminal 5), which has transmitted the data identifier, over the communication network 6. Control is then returned to step S21.

Figure 10:
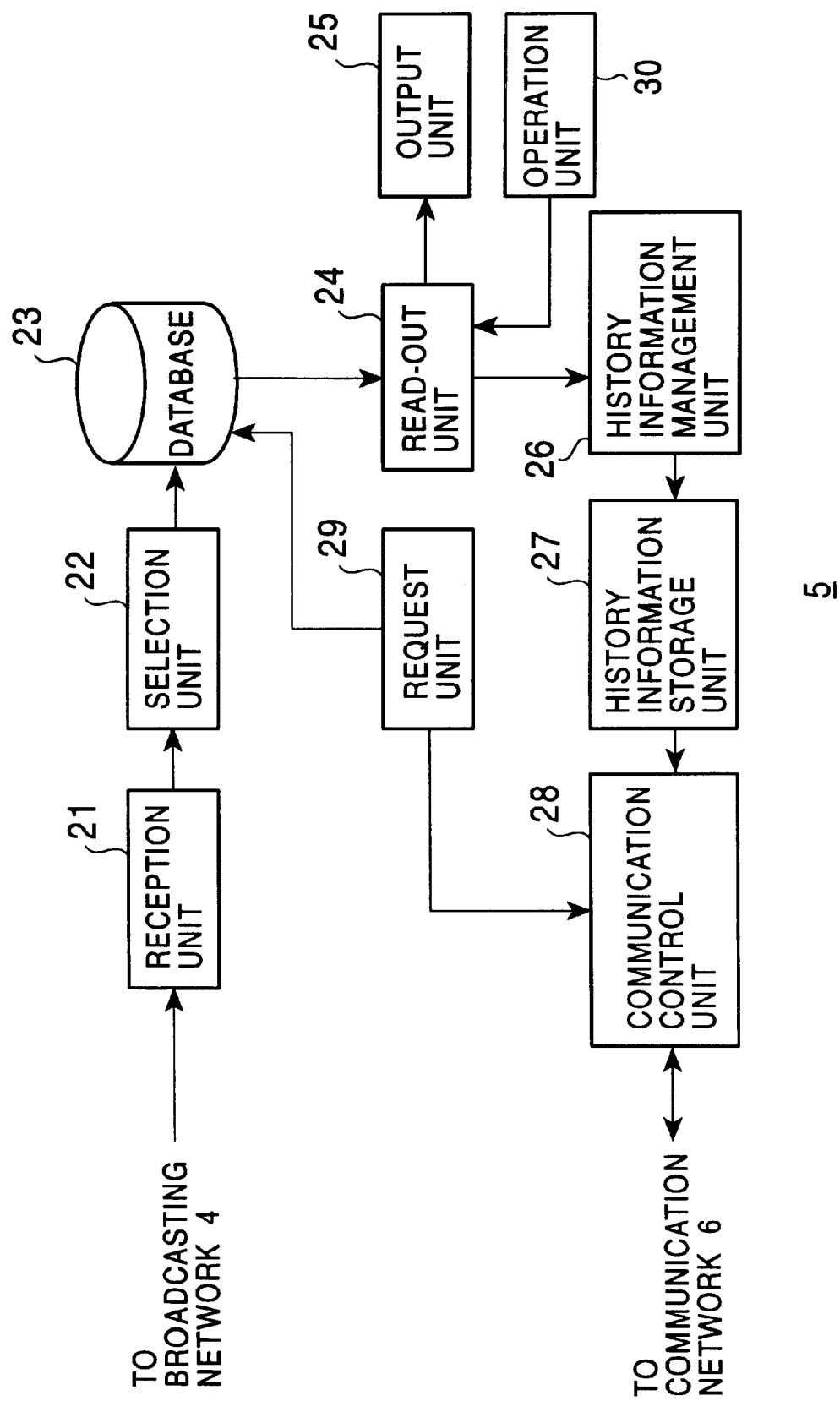
FIG. 10 is a block diagram showing an example of the configuration of a reception terminal 5 shown in FIG. 1.

FIG. 10 shows an example of the configuration of the reception terminal 5 shown in FIG. 1.

A reception unit 21 receives transmission data sent from the server 2 over the broadcasting network 4, and outputs the data to a selection unit 22. The selection unit 22 selects transmission data sent from the reception unit 21 on the basis of history information stored in a history information storage unit 27, and registers normal-format data or update report-format data, which has been transmitted as the selected transmission data, in a database 23. The database 23 is realized with, for example, a large-capacity hard disk or magneto-optical disk, or any other recording medium, and stores (records) transmission data sent from the selection unit 22 or data supplied from a request unit 29. A read-out unit 24 reads data stored in the database 23 responsively to an operation performed at an operation unit 30, and supplies it to an output unit 25. The output unit 25 is realized with, for example, a display or speaker, and displays data sent from the read-out unit 24 or outputs the data as voice.

A history management unit 26 is designed to manage history information that is the read-out history of data read from the database 23 by the read-out unit 24, that is, the audience history of data viewed by users. In other words, the history management unit 26 supervises the read-out unit 24 so that the number of times, by which data has been read from the database 23 by the read-out unit 24, counted for each data identifier will be stored as history information in a history information storage unit 27. The history information storage unit 27 stores history information sent from the history management unit 26. A communication control unit 28 controls communication to be carried out over the communication network 6, whereby history information stored in the history information storage unit 27 or a request for data issued from the request unit 29 is transmitted to the server 2 over the communication network 6, or data transmitted from the server 2 over the communication network 6 is received.

The request unit 29 monitors the database 23. When update report-format data is stored in the database 23, the request unit 29 issues a request for update data specified by a data identifier arranged in the update report-format data is to the server 2 over the communication network 6 by controlling the communication control unit 28. The request unit 29 registers update data, which is received by the communication control unit 28 in response to the request, in the database 23. The operation unit 30 is operated in order to display or output data registered in the database 23 on or to the output unit 25.

The reception terminal 5 having the foregoing components carries out reception of receiving transmission data transmitted from the server 2 over the broadcasting network 4, data request of issuing a request for update data corresponding to update report-format data out of data stored in the database 23, output of outputting data registered in the database 23, and history information transmission of transmitting history information to the server 2.

Referring to the flowchart of FIG. 11, reception will be described first.

When transmission data is transmitted from the server 2 over the broadcasting network 4, the reception unit 21 receives the transmission data at step S31 and transmits it to the selection unit 22. At step S32, the selection unit 22 references history information stored in the history information storage unit so as to judge whether or not the transmission data sent from the reception unit 21 should be selected.

If it is judged at step S32 that the transmission data sent from the reception unit 21 should not be selected, that is, for example, if data identified by a data identifier arranged in normal-format data or update report-format data serving as the transmission data has not been stored as history information (or although data identified by the data identifier is stored, if the number of times by which the data has been read is zero), it is awaited until the next transmission data is transmitted over the broadcasting network 4. Control is then returned to step S31. In this case, the transmission data is not registered in the database 23.

By contrast, if it is judged at step S32 that the transmission data sent from the reception unit 21 should be selected, that is, for example, if data identified by a data identifier arranged in normal-format data or update report-format data serving as the transmission data is stored as history information in the history information storage unit 27, control is passed to step S33.

As mentioned above, when data identified by a data identifier arranged in transmission data is not stored as history information, the transmission data is not registered in the database 23. For example, immediately after the reception terminal 5 is purchased, no history information is stored in the history information storage unit 27. No transmission data is therefore registered in the database 23. By operating a set switch, which is not shown, of the reception terminal 5, as mentioned above, it can be set whether or not the selection unit 22 selects transmission data on the basis of history information. Specifically, when the set switch is set in such a way that transmission data will not be selected on the basis of history information, after the processing of step S31 is completed, the processing of step S32 will not be carried out but the processing of step S33 will be carried out.

Even when such a set switch is not operated, if no history information is stored in the history information storage unit 27, the processing of step S32 can be skipped automatically.

At step S33, the selection unit 22 judges whether or not data having the same data identifier as the data identifier arranged in the transmission data sent from the reception unit 21 has already been stored in the database 23. If it is judged that the data has not been stored, step S34 is skipped, and control is passed to step S35.

If it is judged at step S33 that data having the same data identifier as the data identifier arranged in the transmission data sent from the reception unit 21 has already been stored in the database 23, control is passed to step S34. The selection unit 22 compares version information arranged in the already-stored data (which hereinafter may be called registered data) with version information arranged in the transmission data sent from the reception unit 21. It is thus judged whether or not the transmission data sent from the reception unit 21 is data produced by updating the registered data.

Figure 5:
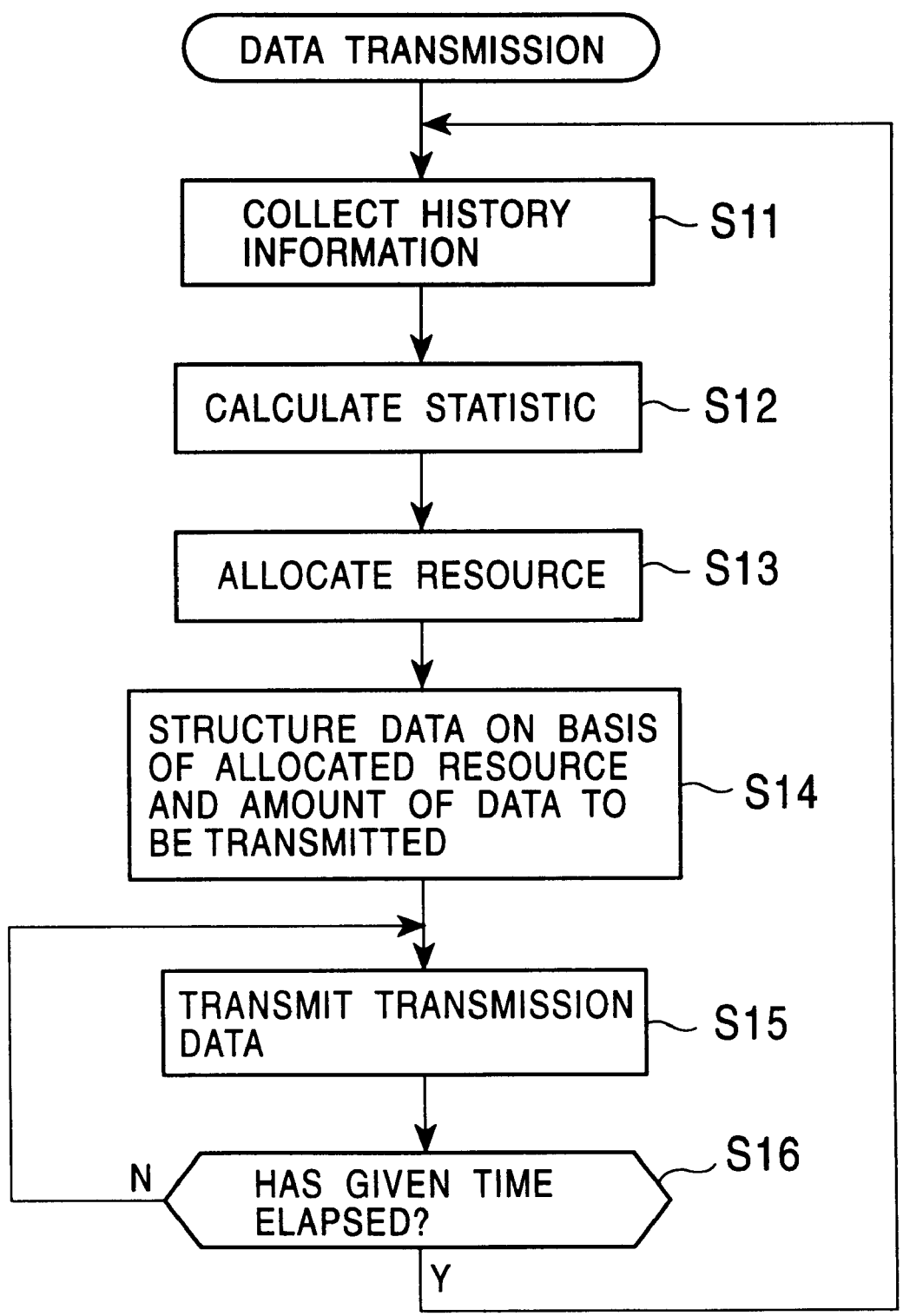
FIG. 5 is a flowchart describing data transmission to be performed by the server 2.

If it is judged at step S34 that the transmission data sent from the reception unit 21 is not data produced by updating the registered data, that is, for example, as described in conjunction with FIG. 5, although the same transmission data is transmitted repeatedly from the server 2 over the broadcasting network 4, if transmission data that was transmitted during a past transmission out of repetitive transmissions has already been registered in the database 23, control is returned to step S31. In this case, the transmission data will not be registered in the database 23 (since the transmission data has already been registered, it need not be newly registered).

If it is judged at step S34 that the transmission data sent from the reception unit 21 is data produced by updating the registered data, control is passed to step S35. The selection unit 22 then judges whether or not the transmission data is normal-format data or update report-format data. If it is judged at step S35 that the transmission data sent from the reception unit 21 is normal-format data, control is passed to step S36. The normal-format data is registered in the database 23 in place of corresponding registered data (by overwriting the corresponding registered data). Control is then returned to step S31. When the processing of step S32 is skipped, writing of data in the database 23 is achieved by adding the data to registered data.

If it is judged at step S35 that the transmission data sent from the reception unit 21 is update report-format data, control is passed to step S37. Version information of registered data corresponding to the update report-format data is updated according to version information arranged in the update report-format data. An update flag indicating that updated data (update data) is present is appended to the registered data having the version information thereof updated. Control is then returned to step S31. When the processing of step S32 is skipped, as mentioned above, update report-format data is written to be added to the registered data. At this time, an update flag is appended to the update report-format data.

It is possible for the reception unit 21 to receive transmission data on the basis of history information stored in the history information storage unit 27. Specifically, for example, when each transmission data is transmitted from the server 2 over the broadcasting network 4 according to a frequency division technique, if transmission data items transmitted this way cannot be received concurrently by the reception unit 21, history information is referenced so that transmission data which has been viewed most frequently can be received as a top priority.

To be more specific, for example, as described in conjunction with FIG. 6, when transmission data items relevant to the data items Da, Db, and Dc have been transmitted, if history information items indicating that the numbers of times by which the data items are viewed are 2, 4, and 1 are stored in the history information storage unit 27, the transmission data items relevant to the data items Db, Da, and Dc are received in that order.

Figure 11:
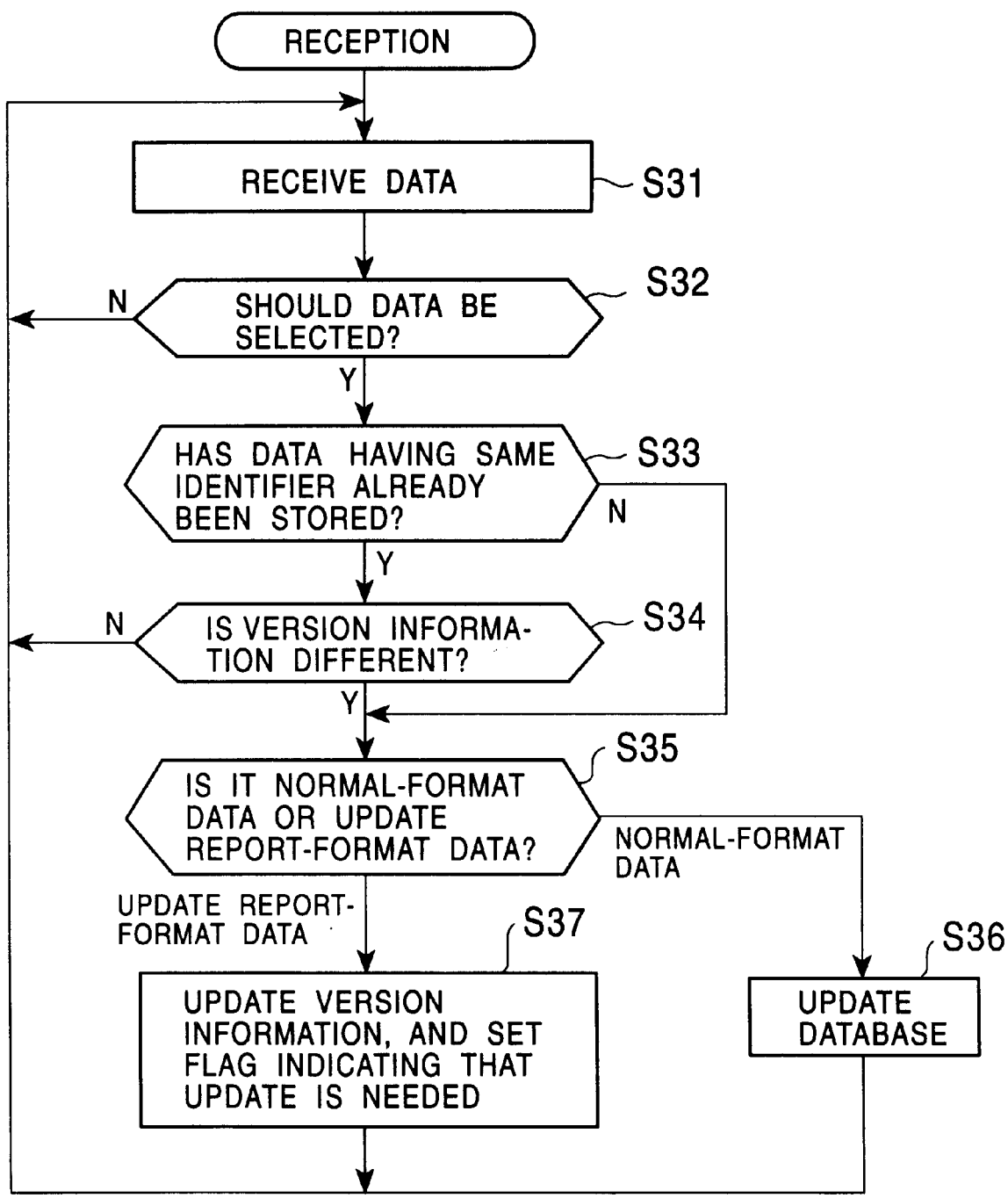
FIG. 11 is a flowchart describing reception to be performed by the reception terminal 5.

Otherwise, a resource necessary for the reception terminal 5 to carry out the processing described in the flowchart of FIG. 11 may be allocated to the data items Da, Db, and Dc at a ratio of 2:4:1.

After data is stored in the database 3 to the extent of the limit of the storage capacity, for example, new data is registered by overwriting the oldest data. In this case, the oldest data is deleted duly.

Figure 12:
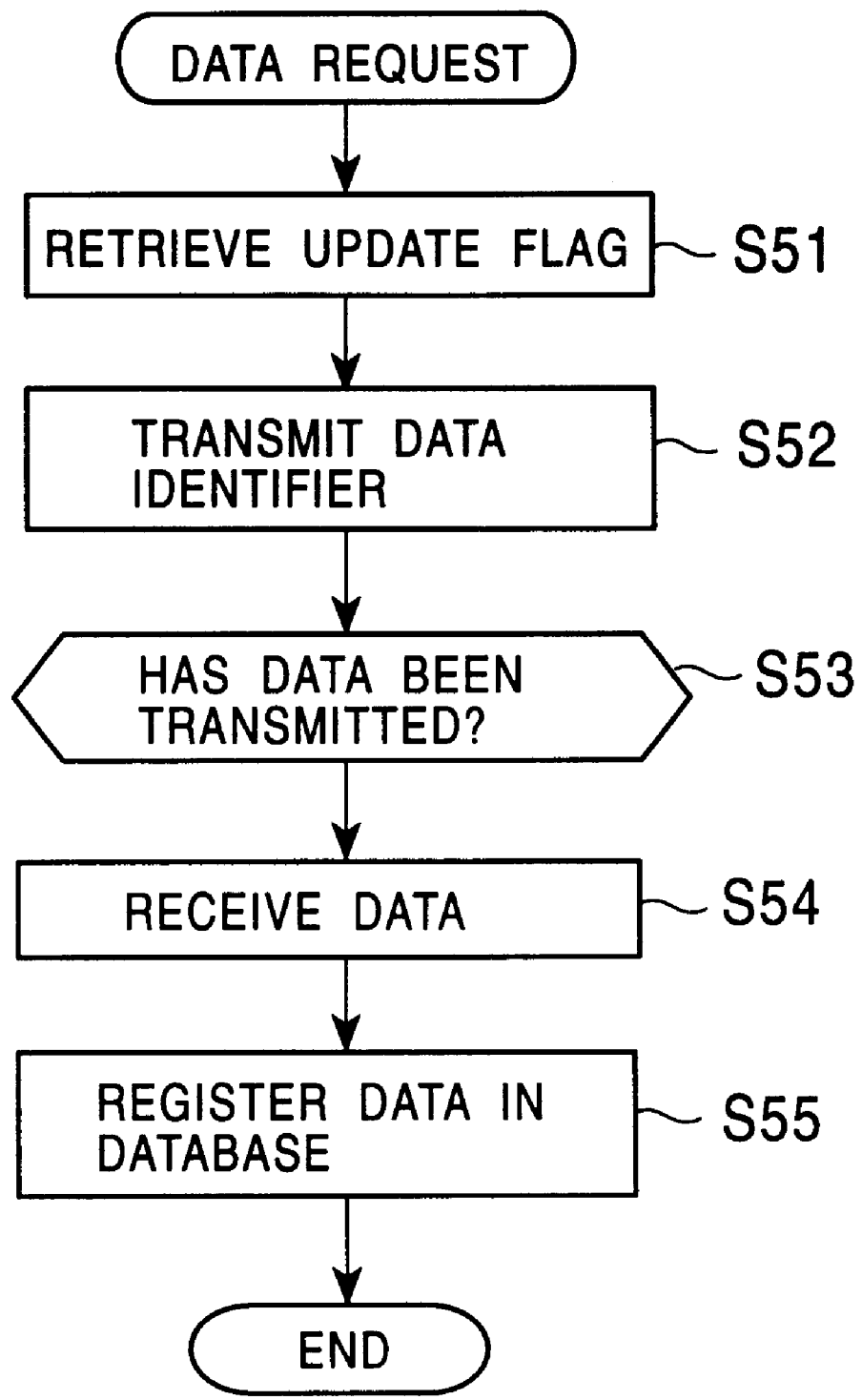
FIG. 12 is a flowchart describing data request to be performed by the reception terminal 5.

Next, referring to FIG. 12, data request will be described. Data request is carried out periodically by the reception terminal 5. However, data request may be carried out non-periodically.

In this case, first, at step S51, the request unit 29 of the reception terminal 5 retrieves all data items, to which the update flag is appended, from among registered data items residing in the database 23. Control is then passed to step S52. At step S52, the request unit 29 controls the communication control unit 28, so that a data identifier arranged in each of the registered data items to which the update flag is appended is transmitted to the server 2 over the communication network 6. Namely, in this case, the request unit 29 controls the communication control unit 28 so as to allow the communication control unit 28 to establish a communication link with the server 2 over the communication network 6. The request unit 29 further controls the communication control unit 28, so that the data identifier arranged in each of the registered data items to which the update flag is appended can be transmitted to the server 2 over the communication network 6 together with a message saying that corresponding update data has been requested.

At step S53, it is judged by the communication control unit 28 whether or not update data requested at step S52 has been transmitted from the server 2 over the communication network 6. If it is judged that the update data has not been transmitted, control is returned to step S52. If it is judged at step S53 that the update data has been transmitted from the server 2 over the communication network 6, that is, if it is judged at step S23 of request data transmission described in conjunction with FIG. 9 that update data has been transmitted, control is passed to step S54. The communication control unit 28 receives the update data, and control is passed to step S55. At step S55, the request unit 29 registers the update data received by the communication control unit 28 (this update data is transmitted according to, for example, as described in conjunction with FIG. 9, the format of normal-format data) is registered in place of corresponding registered data registered in the database 23. The communication control unit 28 then disconnects the link with the server 2 established over the communication network 6. The processing is then terminated.

At step S37 of reception described in conjunction with FIG. 11, the reception unit 5 may issue a request for update data corresponding to update report-format data. In this case, every time an attempt is made to register update report-format data in the database 23, the communication link with the server 2 over the communication network 6 is established or disconnected. This is unpreferable in terms of communication cost. As mentioned above, therefore, anyhow, the update flag is appended to update report-format data, an data request is carried out periodically, whereby it can be prevented that the communication link with the server 2 is established or disconnected frequently. If data request is not carried out for a prolonged period of time, the contents of the database 23 become obsolete. By contrast, carrying out data request frequently is, as mentioned above, unpreferable in terms of communication cost. The frequency of carrying out data request should preferably be determined so that these factors can be balanced.

Figure 13:
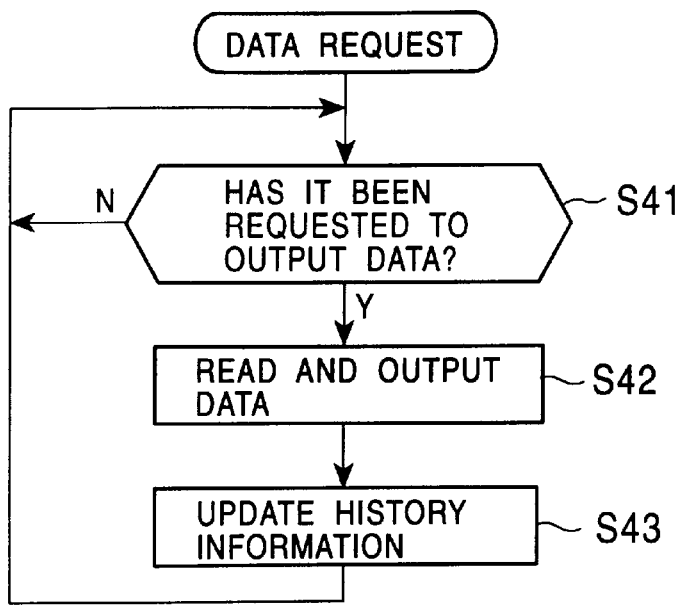
FIG. 13 is a flowchart describing data output to be performed by the reception terminal 5.

Next, referring to the flowchart of FIG. 13, data output will be described.

First of all, at step S41, it is judged whether or not the operation unit 30 has been operated in order to output given registered data stored in the database 23. If it is judged that the operation unit has not been operated, control is returned to step S41. If it is judged at step S41 that the operation unit 30 has been operated in order to output the given registered data stored in the database 23, control is passed to step S42. The read-out unit 24 retrieves and reads the registered data from the database 23. The read-out unit 24 then supplies the read registered data to the output unit 25, whereby the registered data is output by the output unit 25.

Thereafter, control is passed to step S43, and history information is updated. Specifically, when registered data is read from the database 23, the history management unit 26 that is supervising the read-out unit 24 instructs the read-out unit 24 to increment the number of times, by which data serving as history information corresponding to the data identifier is read, by one, and to store the data in the history information storage unit 27. Control is then returned to step S41.

Figure 14:
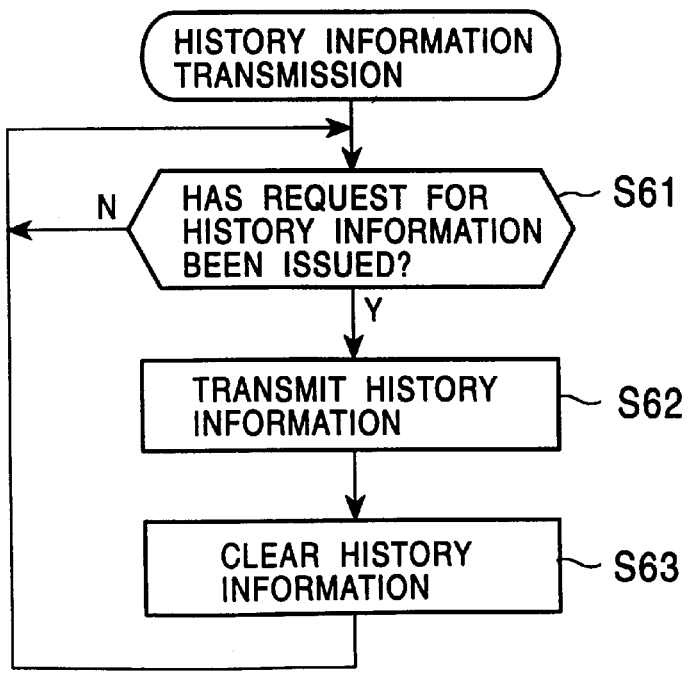
FIG. 14 is a flowchart describing history information transmission to be performed by the reception terminal 5.

Next, referring to the flowchart of FIG. 14, history information transmission will be described.

First of all, at step S61, it is judged by the communication control unit 28 whether or not a request for history information has been issued from the server 2. If it is judged that the request has not been issued, control is returned to step S61. If it is judged at step S61 that the request for history information has been issued, that is, when a request for a link over the communication network 6 is issued from the server 2, after the link is established, if the request for history information has been issued, control is passed to step S62. The communication control unit 28 reads history information from the history information storage unit 27, and transmits it to the server 2 over the communication network 6. Control is then returned to step S63. The contents of the history information storage unit 27 are cleared, and control is returned to step S61.

The application of the present invention to a data distribution system has been described so far. This kind of data distribution system can be adapted to a multimedia contents distribution business based on digital broadcasting to be performed using a satellite.

Furthermore, for example, the present invention can apply to implementation of the IP multicast technique in a network shown in FIG. 15 in which communication is carried out according to the TCP/IP adapted to the Internet. Incidentally, the IP multicast technique is a technology for broadcasting data to a specified group of terminals (referred to as a multicast group) over a TCP/IP network, and has been stipulated as a standard specification entitled "Request For Comment (RFC) 1112" by the Internet Engineering Task Force (IETF). For broadcasting data, special IP addresses (ranging from 224.0.0.0 to 239.255.255.255) referred to as class D addresses are employed. A server for broadcasting data designates a specified class D address, and originates data. Terminals receiving broadcast data designate the class D address. In this case, on receipt of an IP packet whose class D address has been designated, IP multicast-compatible routers each detect a route along which a terminal that has designated the class D address resides, and send a copy of the packet to the terminal.

Figure 15A:
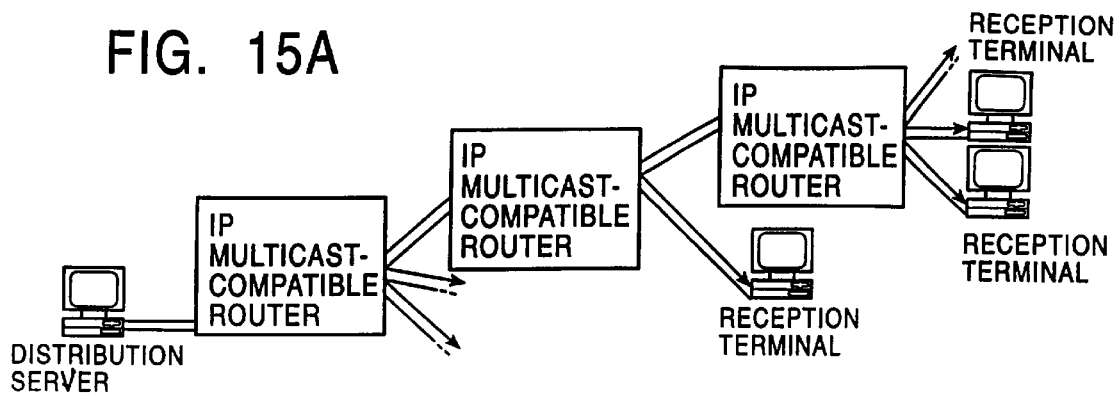
FIGS. 15A to 15C are diagrams showing examples of the configuration of a system in which the IP multicast technique is implemented.
Figure 15B:
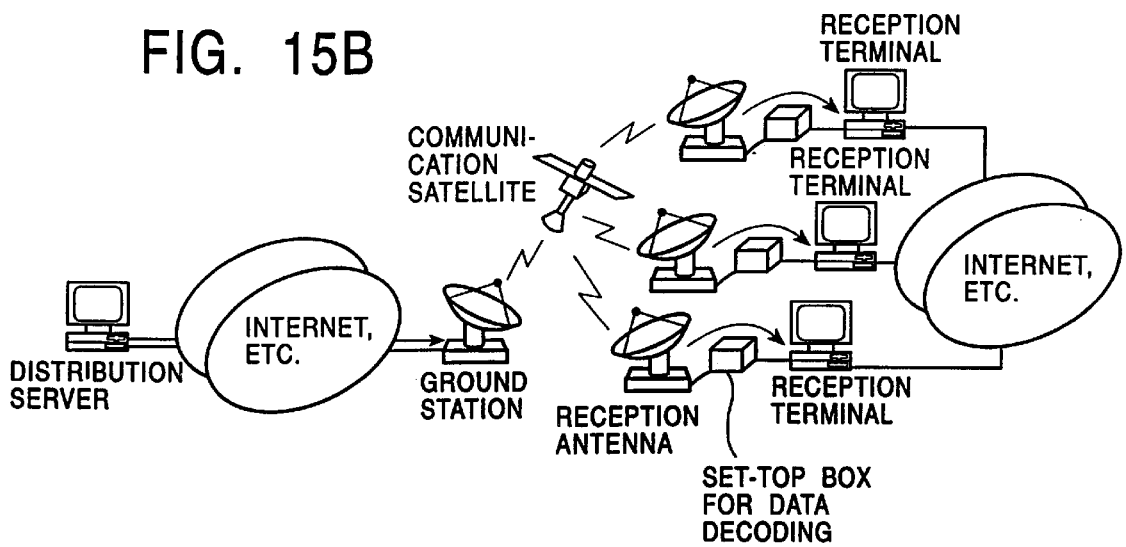
Figure 15C:
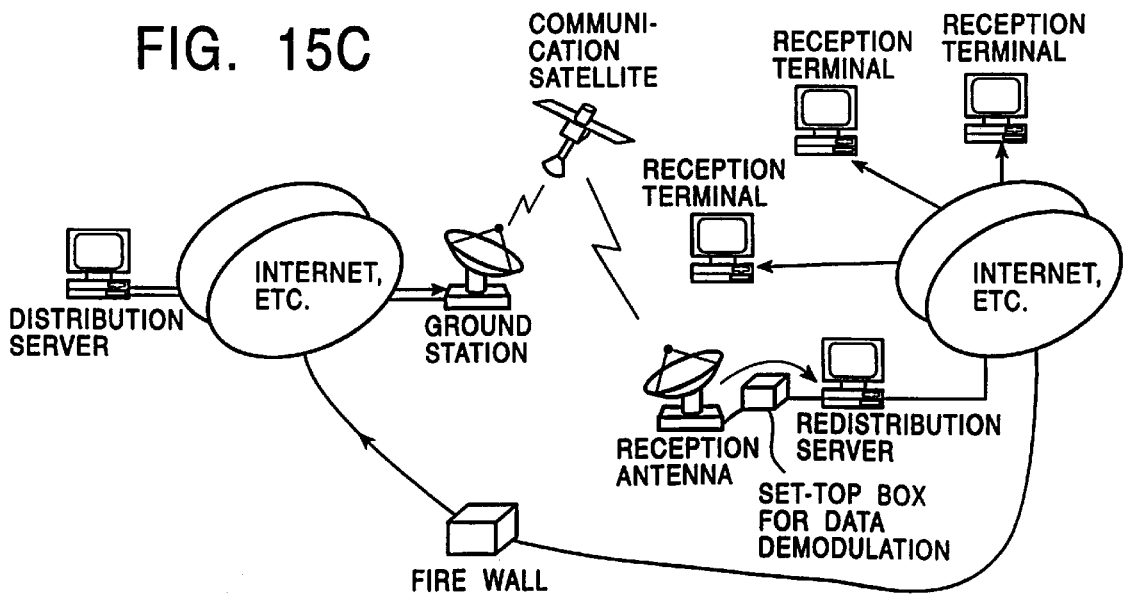

Specifically, in FIG. 15A, data is broadcast from a distribution server to reception terminals via IP multicast-compatible routers. In FIG. 15B, data is broadcast from a distribution server to reception terminals via a communication satellite. In whichever form data is broadcast, the present invention can apply. Furthermore, in FIG. 15C, data sent from the distribution server is transmitted to a redistribution server via a communication satellite. The data is transmitted from the redistribution server to reception terminals. The present invention can apply to either broadcast of data from the distribution server to the redistribution server or broadcast of data from the redistribution server to the reception terminals.

Moreover, the present invention can apply to, for example, any other distributed data system. The distributed data system is constructed by arranging storage units serving as a plurality of databases in which the same data is stored (for example, memories or hard disks) at physically separated positions. When the plurality of databases in which the same data is stored are arranged at physically separated positions, it becomes possible to, for example, handle accesses to the databases by numerous users or applications. Moreover, the reliability of the database can be improved.

In the distributed database system in which a plurality of databases are distributed, when the contents of a certain database among the databases are updated, the contents of the other databases must be updated likewise. In a conventional distributed database system, generally, a plurality of databases are linked over a computer network enabling bi-directional communication, updated data is transferred over the network, and thus data items in the databases are updated.

In the foregoing distributed database system, basically, updating the contents of the plurality of databases must be achieved synchronously for the purpose of ensuring sameness for the contents of all the databases at a certain time instant. In other words, accesses to the databases must be inhibited for a period of time from the start of updating a certain database until the end of updating all the plurality of databases. In the distributed database system, updating the plurality of databases should preferably be accomplished for a shorter period of time.

However, in the conventional distributed database system, databases communicate with one another on a so-called point-to-point basis over the computer network for the purpose of update. For this reason, when the number of databases constituting the distributed database system increases, a load on a resource necessary to carry out communication, a load on a central processing unit (CPU) responsible for control required for update, and the number of overheads increase. Consequently, it becomes hard to update the databases for a short period of time.

As mentioned above, update data is distributed to the databases by utilizing the broadcasting network 4 mainly and the communication network 6 complementally. This enables quick and efficient update of the databases.

In this embodiment, the server 2 determines a quantity of a resource to be allocated to data on the basis of history information of the data. The reception terminal 5 selects whether or not the data should be registered in the database 23. Alternatively, for example, relevant data items may be linked or data items may be classified into given categories. In consideration of history information of data thus linked with the other data items or history information of the data items belonging to a category to which data belongs, the server 2 may determine a quantity of a resource to be allocated to the data, or the reception terminal 5 may select whether or not the data should be registered in the database 23. In this case, information concerning which data items are linked or information concerning a category to which data belongs can be arranged between, for example, version information and data in normal-format data, or arranged to, for example, succeed version information in update report-format data (in this case, update report-format data can be structured merely by deleting data itself arranged as the last division of normal-format data).

In this embodiment, within history information transmission (FIG. 14) performed by the reception terminal 5, after history information is transmitted to the server 2, history information stored in the history information storage unit 27 is cleared. The clear may not be carried out.

Furthermore, in the history information storage unit 27 of the reception terminal 5, like statistic information stored in the statistic information storage unit 13 of the server 2, a ratio of the number of times by which each data has been read to a total number of times by which all data items have been read may be stored as history information. In this case, the reception terminal 5 may process each data according to the ratio serving as history information. Specifically, for example, reception (FIG. 11) to be performed on each data by the reception unit 21 may be carried out according to a ratio represented by history information. Otherwise, deleting data when data is stored in the database 23 to the extent of the limit of the storage capacity may be carried out so that each data can be left according to the ratio represented by history information.

Moreover, the server 2 may divide one day into several time zones, calculate audience ratings of data items in each time zone, and then allocate a resource to the data items. The allocation of a resource may be carried out by weighting it differently among the data items.

According to the first and sixth aspects of the present invention, in a transmission system and transmission method, a resource necessary to carry out transmission over a broadcast network is allocated to update data, which has been updated, out of data stored in a database. Based on the amount of update data and a resource allocated to the update data, transmission data to be transmitted over the broadcast network is structured. The transmission data is transmitted over the broadcast network according to the allocated quantity of the resource. Consequently, a larger quantity of a resource is allocated to data enjoying a higher audience rating, and the data is distributed as a top priority. Eventually, efficient data distribution can be achieved.

According to the seventh and twelfth aspects of the present invention, in a transmission system and transmission method, at least data of a second format out of data of a first format in which update data itself is arranged and the data of the second format in which update report information indicating that data has been updated is arranged is structured in relation to update data, which has been updated, out of data stored in a database. At least a portion of a resource necessary to carry out transmission over a broadcast network is allocated to the data of the second format. The data of the second format is transmitted as transmission data over the broadcast network according to the allocated quantity of the resource. Thus, in relation to data suffering from a low audience rating, update report-format data (data of the second format) not containing the data is structured in consideration of the amount of the data, and then distributed all the time or intermittently. Consequently, it can be prevented a reception terminal or the like from, say, missing data. Eventually, efficient data distribution can be achieved.

According to the thirteenth and fifteenth aspects of the present invention, in a reception system and reception method, at least data of a second format out of data of a first format in which update data, which has been updated, out of data stored in a database is arranged and the data of the second format in which update report information indicating that data has been updated is arranged is received. A request for update data concerning which the fact that data has been updated is reported by the update report information arranged in the data of the second format is transmitted to the database over a bi-directional network enabling bi-directional communication. The update data transmitted from the database over the bi-directional network in response to the request is received. Thus, a broadcasting network enabling broadcast and a communication network enabling bi-directional communication are used in combination. Consequently, efficient data reception can be achieved.

What is claimed is:

1. A transmission system for transmitting data stored in a database over a broadcast network, the transmission system comprising:

an allocating means for establishing a bandwidth allocation of the broadcast network for at least first program data and second program data in accordance with at least a first program data audience rating and a second program data audience rating;

a structuring means for structuring the first program data and the second program data to be transmitted over the broadcast network in accordance with the bandwidth allocation; and a transmitting means for transmitting the first program data and second program data over the broadcast network in accordance with the bandwidth allocation, wherein the first program data audience rating and the second program data audience rating are determined from viewing history information returned to the transmission system by reception terminals.

2. A transmission system according to claim 1, wherein said first program data comprises at least one of updated data for a first program and a first program update report, the first program update report indicative that the first program has been updated, and wherein the second program data comprises at least one of updated data for a second program and a second program update report, the second program update report indicative that the second program has been updated.

3. A transmission system according to claim 2, wherein the first program data comprises a first program update report generated in response to a first program data update, and wherein the allocating means establishes a bandwidth allocation of the broadcast network for the first program update report.

4. A transmission system according to claim 2, further comprising:

a communicating means for communicating with the reception terminals over a bi-directional network; and a retrieving means for retrieving updated data for at least one of the first program and the second program from said database in response to an updated data request received from a requesting reception terminal over the bi-directional network, wherein said communicating means transmits the updated data over the bi-directional network to the requesting reception terminal.

5. A transmission system according to claim 1, further comprising:

a communicating means for communicating with the reception terminals over a bi-directional network; and a collecting means for collecting, over the bi-directional network, the viewing history information returned to the transmission system by the reception terminals, the viewing history information indicative of audience viewing history for the first program data and the second program data.

6. A transmission method for transmitting data stored in a database over a broadcast network, the method comprising:

establishing a bandwidth allocation of the broadcast network for at least first program data and second program data in accordance with a at least a first program data audience rating and a second program data audience rating;

structuring the first program data and the second program data to be transmitted over the broadcast network in accordance with the bandwidth allocation; and transmitting the first program data and second program data over the broadcast network in accordance with the bandwidth allocation, wherein the first program data audience rating and the second program data audience rating are determined from viewing history information returned to the transmission system by reception terminals.

7. A method according to claim 6, wherein structuring comprises structuring first program data including at least one of updated data for a first program and a first program update report, the first program update report indicative that the first program has been updated, and further comprising structuring second program data including at least one of updated data for a second program and a second program update report, the second program update report indicative that the second program has been updated.

8. A method according to claim 7, wherein the first program data comprises a first program update report generated in response to a first program data update, and wherein establishing comprises establishing a bandwidth allocation of the broadcast network for the first program update report.

9. A method according to claim 7, further comprising:

communicating with the reception terminals over a bi-directional network; and retrieving updated data for at least one of the first program and the second program from said database in response to an updated data request received from a requesting reception terminal over the bi-directional network, wherein communicating comprises transmitting the updated data over the bi-directional network to the requesting reception terminal.

10. A method according to claim 6, further comprising:

communicating with the reception terminals over a bi-directional network; and collecting, over the bi-directional network, the viewing history information returned to the transmission system by the reception terminals, the viewing history information indicative of audience viewing history for the first program data and the second program data.

11. A transmission system for transmitting data stored in a database over a broadcast network, the transmission system comprising:

a structuring means for structuring first program update reports based on a first program data format for first program data, the first program update reports indicative that a first program has been updated;

an allocating means for establishing a bandwidth allocation of the broadcast network for the first program update reports, the bandwidth allocation less than a total available broadcast network bandwidth;

a transmitting means for transmitting the first program update reports over the broadcast network in accordance with the bandwidth allocation.

12. A transmission system according to claim 11, wherein said allocating means establishes the bandwidth allocation for the first program update reports at least one of intermittently and on a continuous basis.

13. A transmission system according to claim 11, wherein said allocating means allocates a first program data bandwidth that is at most a remaining quantity of the total available broadcast network bandwidth for transmission of the first program data, and wherein the transmission means transmits the first program data over the broadcast network according to the remaining quantity of the total available broadcast network bandwidth.

14. A transmission system according to claim 13, further comprising:

a communicating means for communicating with reception terminals over a bi-directional network; and a collecting means for collecting, over the bi-directional network, viewing history information returned to the transmission system by the reception terminals, the viewing history information indicative of audience viewing history for the first program data, wherein the allocating means allocates the first program data bandwidth in accordance with the viewing history information.

15. A transmission system according to claim 11, further comprising:

a communicating means for communicating with reception terminals over a bi-directional network; and a retrieving means for retrieving first program updated data from said database in response to an updated data request received from a requesting reception terminal over the bi-directional network, wherein said communicating means transmits the first program updated data over the bi-directional network to the requesting reception terminal.

16. A transmission method for transmitting data stored in a database over a broadcast network, the method comprising:

structuring first program update reports based on a first program data format for first program data, the first program update reports indicative that a first program has been updated;

establishing a bandwidth allocation of the broadcast network for the first program update reports, the bandwidth allocation less than a total available broadcast network bandwidth;

transmitting the first program update reports over the broadcast network in accordance with the bandwidth allocation.

17. A method according to claim 16, wherein establishing comprises establishing a first program data bandwidth that is at most a remaining quantity of the total available broadcast network bandwidth for transmission of the first program data, and wherein transmitting comprises transmitting the first program data over the broadcast network according to the remaining quantity of the total available broadcast network bandwidth.

18. A method according to claim 17, further comprising:

communicating with reception terminals over a bi-directional network; and collecting, over the bi-directional network, viewing history information returned to the transmission system by the reception terminals, the viewing history information indicative of audience viewing history for the first program data, wherein establishing comprises establishing the first program data bandwidth in accordance with the viewing history information.

19. A method according to claim 16, further comprising:

communicating with reception terminals over a bi-directional network; and retrieving first program updated data from said database in response to an updated data request received from a requesting reception terminal over the bi-directional network, wherein communicating comprises transmitting the first program updated data over the bi-directional network to the requesting reception terminal.

20. A reception system for receiving data stored in a database in a transmission system and transmitted over a broadcast network, the reception system comprising:

a receiving means for receiving a first program update report based on a first program data format for first program data, the first program update reports indicative that a first program has been updated;

a requesting means for issuing a first program data update request in response to the first program update report; and a communicating means for communicating with the transmission system over a bi-directional network;

wherein the communicating means transmits the first program data update request to the transmission system over the bi-directional network, and receives first program updated data from the database over the bi-directional network in response to the first program data update request.

21. A reception system according to claim 20, further comprising a history information management unit for maintaining viewing history information indicative of audience viewing history for the first program updated data.

22. A reception system according to claim 21, wherein the communication means transmits the viewing history information to the transmission system for bandwidth allocation.

23. A method for receiving data stored in a database in a transmission system and transmitted over a broadcast network, the method comprising:

receiving a first program update report based on a first program data format for first program data, the first program update reports indicative that a first program has been updated;

issuing a first program data update request in response to the first program update report; and communicating with the transmission system over a bi-directional network;

wherein communicating comprises transmitting the first program data update request to the transmission system over the bi-directional network, and receiving first program updated data from the database over the bi-directional network in response to the first program data update request.

24. A reception system according to claim 23, further comprising maintaining viewing history information indicative of audience viewing history for the first program updated data.

25. A reception system according to claim 24, wherein communicating further comprises transmitting the viewing history information to the transmission system for bandwidth allocation.

* * * * *